US009562546B2

(12) United States Patent
Takahashi et al.

(10) Patent No.: US 9,562,546 B2
(45) Date of Patent: Feb. 7, 2017

(54) HYDRAULIC CONTROL CIRCUIT AND ITS CONTROL METHOD

(71) Applicant: JATCO LTD, Fuji-shi, Shizuoka (JP)

(72) Inventors: Seiichiro Takahashi, Isehara (JP);
Takashi Eguchi, Machida (JP);
Tomohiro Utagawa, Sagamihara (JP);
Hisao Nobu, Hachioji (JP); Kenji Sakakibara, Sagamihara (JP);
Takahiro Ikeda, Zama (JP); Masayuki Shimizu, Ayase (JP)

(73) Assignee: JATCO LTD, Fuji-Shi (JP)

( * ) Notice: Subject to any disclaimer, the term of this patent is extended or adjusted under 35 U.S.C. 154(b) by 324 days.

(21) Appl. No.: 14/387,741

(22) PCT Filed: Feb. 21, 2013

(86) PCT No.: PCT/JP2013/054384
§ 371 (c)(1),
(2) Date: Sep. 24, 2014

(87) PCT Pub. No.: WO2013/145971
PCT Pub. Date: Oct. 3, 2013

(65) Prior Publication Data
US 2015/0075360 A1  Mar. 19, 2015

(30) Foreign Application Priority Data
Mar. 28, 2012 (JP) ................... 2012-074966

(51) Int. Cl.
*F16H 59/00* (2006.01)
*F16H 61/00* (2006.01)
(Continued)

(52) U.S. Cl.
CPC ....... *F15B 13/0442* (2013.01); *F16H 61/0204* (2013.01); *F16H 61/06* (2013.01); *B60Y 2400/72* (2013.01); *F15B 2211/6653* (2013.01)

(58) Field of Classification Search
CPC ............... F16H 61/66272; F16H 2061/66281; F16H 61/0021; Y10T 477/624
(Continued)

(56) References Cited
U.S. PATENT DOCUMENTS 6,086,513 A * 7/2000 Tominaga ........... F16H 61/0021
477/169
6,217,469 B1 * 4/2001 Sawada ............. F16H 61/66272
474/13
(Continued)

FOREIGN PATENT DOCUMENTS
JP    06-207662 A    7/1994
JP    11-037237 A    2/1999
(Continued)

*Primary Examiner* — Henry Liu
(74) *Attorney, Agent, or Firm* — Foley & Lardner LLP

(57) ABSTRACT

In a hydraulic control circuit including a solenoid valve, whose change responsiveness in an actual pressure with respect to a change in an instructional pressure deteriorates when the instructional pressure enters a dead band region on a lower pressure side than a dead band threshold, for adjusting a hydraulic pressure supplied to a hydraulic device operated by the hydraulic pressure based on the instructional pressure, the instructional pressure is increased in a stepwise manner to a charge pressure higher than the dead band threshold, when the instructional pressure is set in the dead band region and the instructional pressure increases within the dead band region to such an extent that a speed ratio does not change. Then, a lower limit of the instructional pressure is set to the dead band threshold, and use of the dead band region is prohibited for a certain period of time.

6 Claims, 5 Drawing Sheets

(51) Int. Cl.
*F16H 63/00* (2006.01)
*F15B 13/044* (2006.01)
*F16H 61/02* (2006.01)
*F16H 61/06* (2006.01)

(58) Field of Classification Search
USPC .......................................................... 474/28
See application file for complete search history.

(56) References Cited

U.S. PATENT DOCUMENTS

| | | | | |
|---|---|---|---|---|
| 6,513,886 | B1* | 2/2003 | Weber | B60T 8/171 |
| | | | | 303/146 |
| 7,715,967 | B2* | 5/2010 | Kim | F16H 61/30 |
| | | | | 474/28 |
| 7,918,753 | B2* | 4/2011 | Murakami | F16H 61/66272 |
| | | | | 474/18 |
| 8,133,140 | B2* | 3/2012 | Yamaguchi | F16H 61/66272 |
| | | | | 474/18 |
| 2001/0046911 | A1* | 11/2001 | Taniguchi | F16H 61/66272 |
| | | | | 474/18 |
| 2001/0049312 | A1* | 12/2001 | Warner | F16H 55/56 |
| | | | | 474/18 |
| 2002/0173391 | A1* | 11/2002 | Endo | B60K 6/44 |
| | | | | 474/18 |
| 2003/0022742 | A1* | 1/2003 | Fujimoto | F16H 61/0246 |
| | | | | 474/18 |
| 2004/0063525 | A1* | 4/2004 | Ochiai | F16H 57/0434 |
| | | | | 474/28 |
| 2005/0192131 | A1* | 9/2005 | Yamamoto | F16H 61/66272 |
| | | | | 474/18 |
| 2006/0079356 | A1* | 4/2006 | Kodama | F16H 61/0021 |
| | | | | 474/28 |
| 2007/0142142 | A1* | 6/2007 | Yamaguchi | F16H 61/66272 |
| | | | | 474/28 |
| 2009/0005200 | A1* | 1/2009 | Brown | F16H 61/0025 |
| | | | | 474/24 |
| 2009/0011888 | A1* | 1/2009 | Kawahigashi | F16H 61/66272 |
| | | | | 475/127 |
| 2009/0286643 | A1* | 11/2009 | Brown | F16H 37/022 |
| | | | | 475/127 |
| 2012/0035009 | A1* | 2/2012 | Mano | F16H 61/0021 |
| | | | | 474/28 |
| 2014/0246897 | A1* | 9/2014 | Miyata | B60T 13/141 |
| | | | | 303/10 |

FOREIGN PATENT DOCUMENTS

| | | |
|---|---|---|
| JP | 2006-029515 A | 2/2006 |
| JP | 2008-002483 A | 1/2008 |
| JP | 2009-014138 A | 1/2009 |

* cited by examiner

HYDRAULIC CONTROL CIRCUIT AND ITS CONTROL METHOD

TECHNICAL FIELD

The present invention relates to hydraulic control circuits and, more particularly, to a hydraulic control circuit that is provided with a solenoid valve having a dead band region.

BACKGROUND ART

Solenoid valves are used for adjusting hydraulic pressures supplied to hydraulic devices, such as hydraulic pistons, actuators, clutches and brakes, which are operated by the hydraulic pressures, to be instructional pressures. Each of the solenoid valves is supplied with a current corresponding to the instructional pressure, so as to adjust an original pressure supplied from an oil pump or the like, and to supply the hydraulic pressure that is equal to the instructional pressure to the hydraulic device.

However, some solenoid valves have a dead band region, in which an actual pressure is hard to be reduced even though the instructional pressure is reduced, on a low pressure side. When the solenoid valve is controlled in that region, a change in the hydraulic pressure that is supplied to the device operated by the hydraulic pressure is delayed, and thus deterioration in control responsiveness is caused.

For this reason, according to JP2009-14138A, a change in the actual pressure, at the time when the instructional pressure is changed, is examined so as to identify the dead band region of the solenoid valve, and not to use the dead band region.

SUMMARY OF INVENTION

With increasing needs for fuel efficiency in recent years, it is required to reduce the hydraulic pressure supplied to the hydraulic device and to reduce a load of the oil pump.

When the instructional pressure is set in the dead band region, it is possible to reduce the hydraulic pressure supplied to the hydraulic device. However, there is a problem of the deterioration in the control responsiveness in the dead band region, as described above. It is especially difficult for the hydraulic device, with which the control responsiveness is required, to set the instructional pressure in the dead band region.

It is an object of the present invention to reduce the hydraulic pressure supplied to the hydraulic device, by using the solenoid valve in the dead band region, and to secure the responsiveness when it is necessary to increase the hydraulic pressure supplied to the hydraulic device.

According to an aspect of the present invention, provided is a hydraulic control circuit including a solenoid valve, whose responsiveness of a change in an actual pressure with respect to a change in an instructional pressure deteriorates when the instructional pressure enters a dead band region that is on a lower pressure side than a dead band threshold, for adjusting a hydraulic pressure supplied to a hydraulic device operated by the hydraulic pressure based on the instructional pressure, and a controller for giving an instruction of the instructional pressure to the solenoid valve, in which, when the instructional pressure is set in the dead band region and the instructional pressure increases within the dead band region to such an extent that a speed ratio does not change, the controller increases the instructional pressure in a stepwise manner to a charge pressure that is higher than the dead band threshold, thereafter sets a lower limit of the instructional pressure to be the dead band threshold, and prohibits use of the dead band region for a certain period of time.

According to another aspect of the present invention, provided is a control method of a hydraulic control circuit including a solenoid valve, whose responsiveness of a change in an actual pressure with respect to a change in an instructional pressure deteriorates when the instructional pressure enters a dead band region that is on a lower pressure side than a dead band threshold, for adjusting a hydraulic pressure supplied to a hydraulic device operated by the hydraulic pressure based on the instructional pressure, the control method including increasing the instructional pressure in a stepwise manner to a charge pressure that is higher than the dead band threshold, when the instructional pressure is set in the dead band region and the instructional pressure increases within the dead band region to such an extent that a speed ratio does not change, and thereafter setting a lower limit of the instructional pressure to be the dead band threshold, and prohibiting use of the dead band region for a certain period of time.

According to these aspects, the hydraulic pressure supplied to the hydraulic device is reduced by using the solenoid valve in the dead band region. When the instructional pressure is increased in the dead band region, the actual pressure is increased to the dead band threshold or more by increasing the instructional pressure to the charge pressure and thereafter limiting the instructional pressure by the dead band threshold, and the actual pressure is kept at the dead band threshold or more for the certain period time. This makes it possible to secure the responsiveness when it is necessary to increase the hydraulic pressure supplied to the hydraulic device.

An embodiment and advantages of the present invention will be explained in detail with reference to the attached drawings.

DESCRIPTION OF EMBODIMENTS

Figure 1:
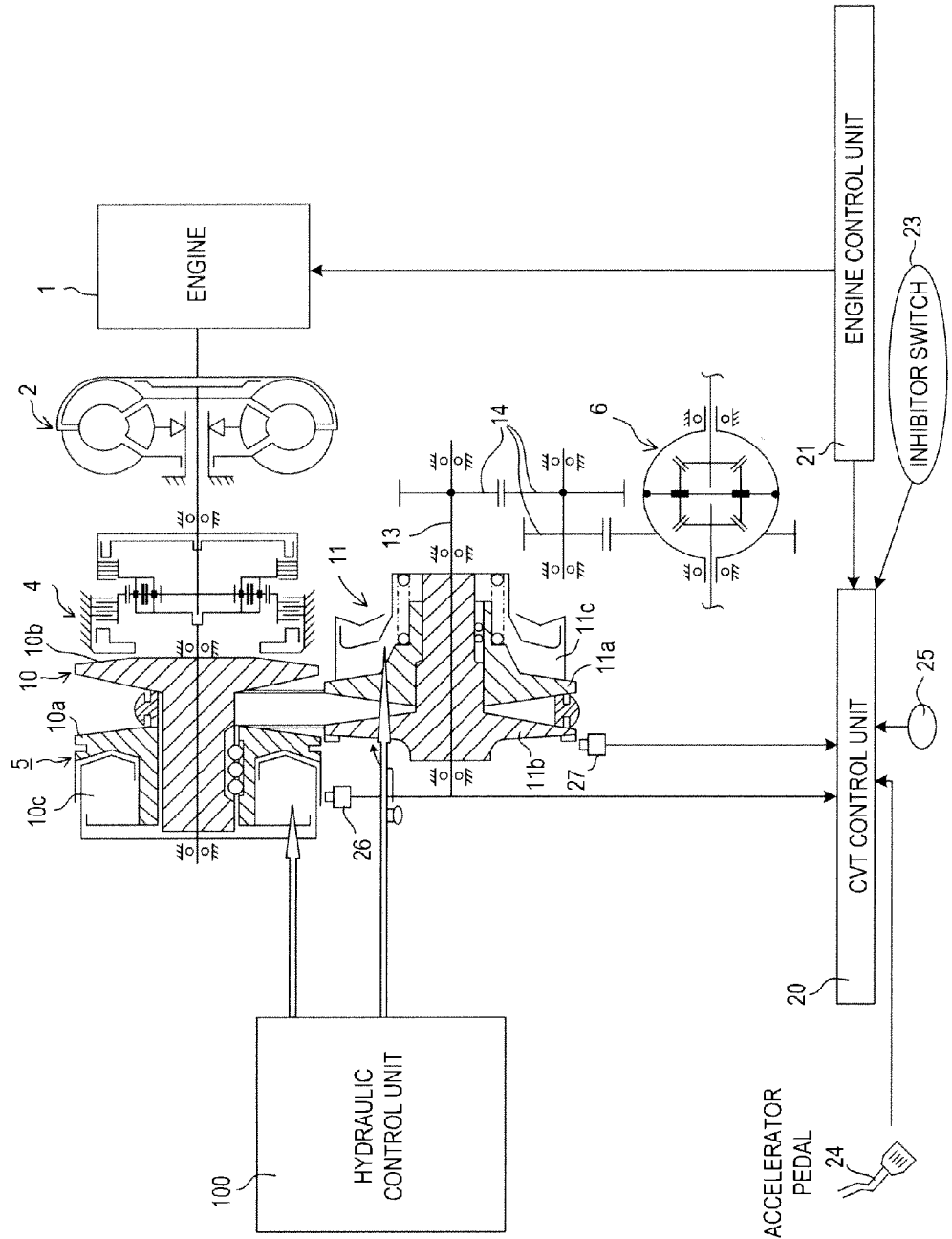
FIG. 1 is a schematic block diagram of a continuously variable transmission.
Figure 2:
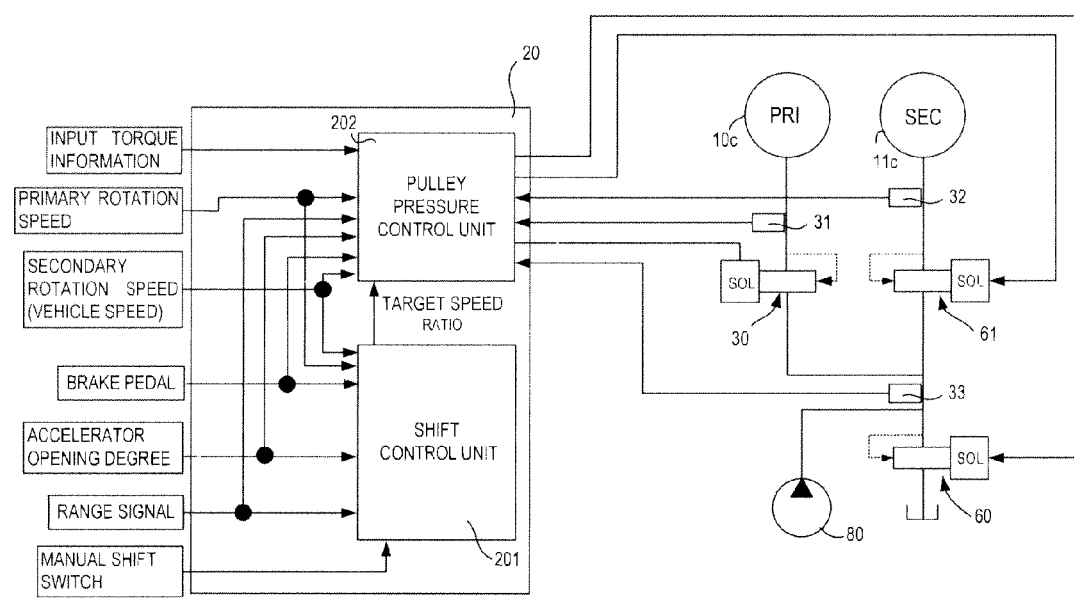
FIG. 2 is a view illustrating a hydraulic control system of the continuously variable transmission.

FIG. 1 illustrates a schematic configuration of a continuously variable transmission, and FIG. 2 illustrates a hydraulic control system of the continuously variable transmission.

In FIG. 1, a continuously variable transmission 5 is coupled to an engine 1 via a torque converter 2 that is provided with a lock-up clutch and a forward/reverse movement switching mechanism 4. The continuously variable transmission 5 is provided with a primary pulley 10 on an input shaft side and a secondary pulley 11 coupled to an output shaft 13. The primary pulley 10 and the secondary pulley 11 are coupled by a belt 12. The output shaft 13 is coupled to a differential 6 via an idler gear 14 and an idler shaft.

A speed ratio of the continuously variable transmission 5 and a contact frictional force of the belt 12 are controlled by a hydraulic control unit 100 that operates according to an instruction from a CVT control unit 20. The CVT control unit 20 decides a target speed ratio and a target contact frictional force based on input torque information from an engine control unit 21 that controls the engine 1 and an output from a later-described sensor and the like, and gives the instruction to the hydraulic control unit 100.

The primary pulley 10 is provided with a fixed conical plate 10b that rotates together with the input shaft, and a movable conical plate 10a that is arranged opposingly to the fixed conical plate 10b to form a V-shaped pulley groove and that is displaceable in the axial direction by a hydraulic pressure (primary pressure) supplied to a primary pulley cylinder chamber 10c.

The secondary pulley 11 is provided with a fixed conical plate 11b that rotates together with the output shaft 13, and a movable conical plate 11a that is arranged opposingly to the fixed conical plate 11b to form a V-shaped pulley groove and that is displaceable in the axial direction according to a hydraulic pressure (secondary pressure) supplied to a secondary pulley cylinder chamber 11c.

Torque inputted from the engine 1 is inputted to the continuously variable transmission 5 via the torque converter 2 and the forward/reverse movement switching mechanism 4, and is transmitted from the primary pulley 10 to the secondary pulley 11 via the belt 12. The movable conical plate 10a of the primary pulley 10 and the movable conical plate 11a of the secondary pulley 11 are displaced in the axial direction, and contact radii with the belt 12 are changed, so that the speed ratio between the primary pulley 10 and the secondary pulley 11 can be changed continuously.

As illustrated in FIG. 2, the hydraulic control unit 100 is provided with a regulator valve 60 that adjusts a line pressure, a solenoid valve 30 that adjusts the primary pressure, and a solenoid valve 61 that adjusts the secondary pressure.

The regulator valve 60 adjusts a predetermined line pressure PL according to an operation state, based on the instruction from the CVT control unit 20 (for example, a duty signal or the like), by using a hydraulic pressure supplied from an oil pump 80 as an original pressure. The line pressure PL is supplied respectively to the solenoid valve 30 that adjusts the primary pressure and the solenoid valve 61 that adjusts the secondary pressure.

A pulley ratio between the primary pulley 10 and the secondary pulley 11 is controlled by the solenoid valves 30 and 61 that are driven according to instructional pressures from the CVT control unit 20. In other words, the primary pressure that is adjusted by the solenoid valve 30 is supplied to the primary pulley 10, and the secondary pressure that is adjusted by the solenoid valve 61 is supplied to the secondary pulley 11. This causes groove widths of the primary pulley 10 and the secondary pulley 11 to change, and causes the pulley ratio to change. The pulley ratio is a value calculated by a ratio between a rotation speed of the primary pulley 10 and a rotation speed of the secondary pulley, and the speed ratio is a value obtained by reflecting a gear ratio of the idler gear 14 on the pulley ratio.

Figure 3:
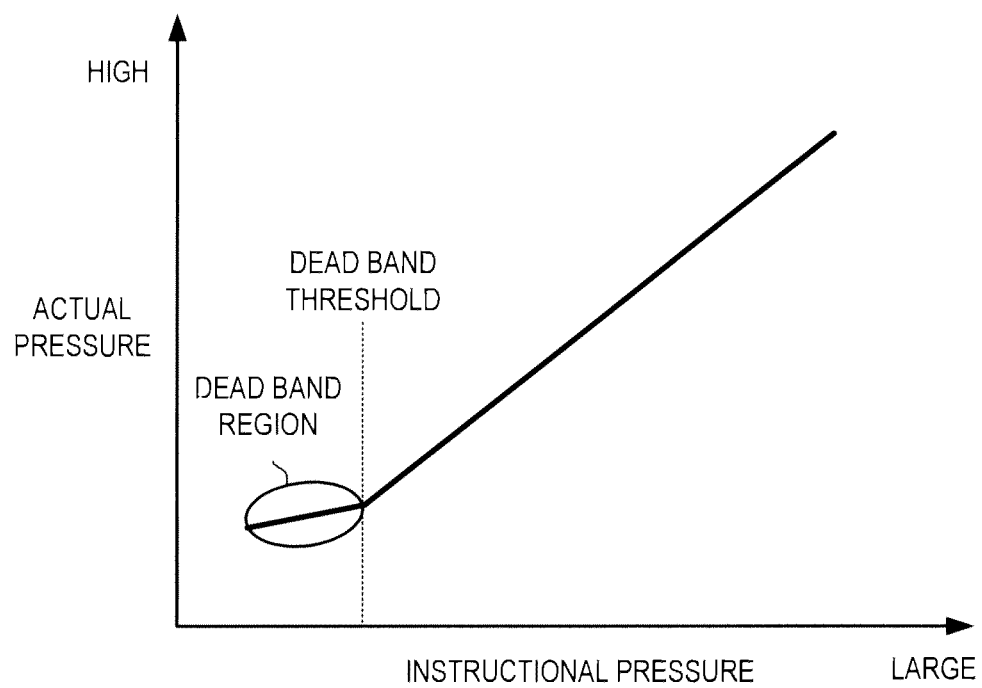
FIG. 3 is a characteristic chart of a solenoid valve.

FIG. 3 illustrates characteristics of the solenoid valves 30 and 61. The solenoid valves 30 and 61 have such characteristics that an actual pressure decreases as the instructional pressure is reduced, but from a certain value, the actual pressure does not change much even through the instructional pressure is reduced. The value at which responsiveness of the solenoid valves 30 and 61 begins to deteriorate is referred to as a dead band threshold, and control responsiveness of the solenoid valves 30 and 61 deteriorates in a dead band region that is on a low pressure side from the dead band threshold.

However, according to this embodiment, this region is used under predetermined operation conditions, as will be described later, thus reducing a load of the oil pump 80 and further improving fuel efficiency of a vehicle on which the continuously variable transmission 5 is mounted.

As illustrated in FIG. 1, the CVT control unit 20 reads the rotation speed of the primary pulley 10 of the continuously variable transmission 5 from a primary pulley speed sensor 26, the rotation speed of the secondary pulley 11 from a secondary pulley speed sensor 27 (or a vehicle speed), a shift position from an inhibitor switch 23, an accelerator opening degree from an accelerator opening degree sensor 24 (an operation amount of an accelerator pedal), and an oil temperature of the continuously variable transmission 5 from an oil temperature sensor 25, and, as illustrated in FIG. 2, reads the primary pressure from a primary pressure sensor 31, the secondary pressure from a secondary pressure sensor 32, and the line pressure from a line pressure sensor 33, so as to control the speed ratio and the contact frictional force of the belt 12.

The CVT control unit 20 is provided with a shift control unit 201 that decides the target speed ratio and the target shift speed according to the rotation speed of the primary pulley 10, the rotation speed of the secondary pulley 11 (the vehicle speed), and drive intentions of a driver, such as, for example, the accelerator opening degree, presence or absence of operation of a brake pedal, a travelling range, switching of a manual-mode shift switch of the transmission, and the like, and that controls an actual speed ratio toward the target speed ratio by the target shift speed, and a pulley pressure control unit 202 that controls thrusts of the primary pulley 10 and the secondary pulley 11 according to the input torque, the speed ratio, the shift speed, an operation state of the brake pedal, the accelerator opening degree, a shift range, and the like.

The pulley pressure control unit 202 decides an instructional pressure of the line pressure from the input torque information, the pulley ratio based on the primary pulley rotation speed and the secondary pulley rotation speed, the operation state of the brake, the accelerator opening degree, and the shift range, and performs feedback control of the regulator valve 60 so that the line pressure agrees with the instructional pressure based on a deviation between the instructional pressure and the actual pressure detected by the line pressure sensor 33. In addition, the pulley pressure control unit 202 decides the instructional pressures of the primary pressure and the secondary pressure, and performs feedback control of the solenoid valves 30 and 61 so that the primary pressure and the secondary pressure agree with the instructional pressures based on deviations between the instructional pressures and the actual pressures detected by the primary pressure sensor 31 and the secondary pressure sensor 32.

In order to improve the fuel efficiency of the vehicle on which the continuously variable transmission 5 is mounted, it is important to reduce the line pressure and to reduce the load of the oil pump 80. Especially when the input torque to the continuously variable transmission 5 is relatively small and the speed ratio is the highest (smallest speed ratio), a belt clamp force for torque transmission can be kept low, and thus the line pressure can be reduced.

Therefore, the CVT control unit 20 reduces the line pressure when all the following conditions are satisfied (when, for example, the vehicle is in a coast travel state):

the speed ratio of the continuously variable transmission 5 is the highest;

the input rotation speed to the continuously variable transmission 5 is a predetermined low rotation speed or less; and the vehicle speed is a predetermined high vehicle speed or more.

However, when the primary pressure is reduced along with the reduction of the line pressure, it is necessary to further reduce the secondary pressure, which is already low, in order to secure a differential thrust that is required for maintaining the highest speed ratio. This may cause the instructional pressure of the solenoid valve 61 to enter the dead band region as illustrated in FIG. 3. When the instructional pressure enters the dead band region, a longer period of time is required to increase the secondary pressure when a downshift request is made, and the required shift responsiveness becomes hard to realize.

For this reason, the CVT control unit 20 performs control to exit from the dead band region as will be described later and, when the downshift request is made after the control to exit from the dead band region, increases the secondary pressure to quickly perform the down-shift of the continuously variable transmission 5, so as to realize the required shift responsiveness.

Figure 4:
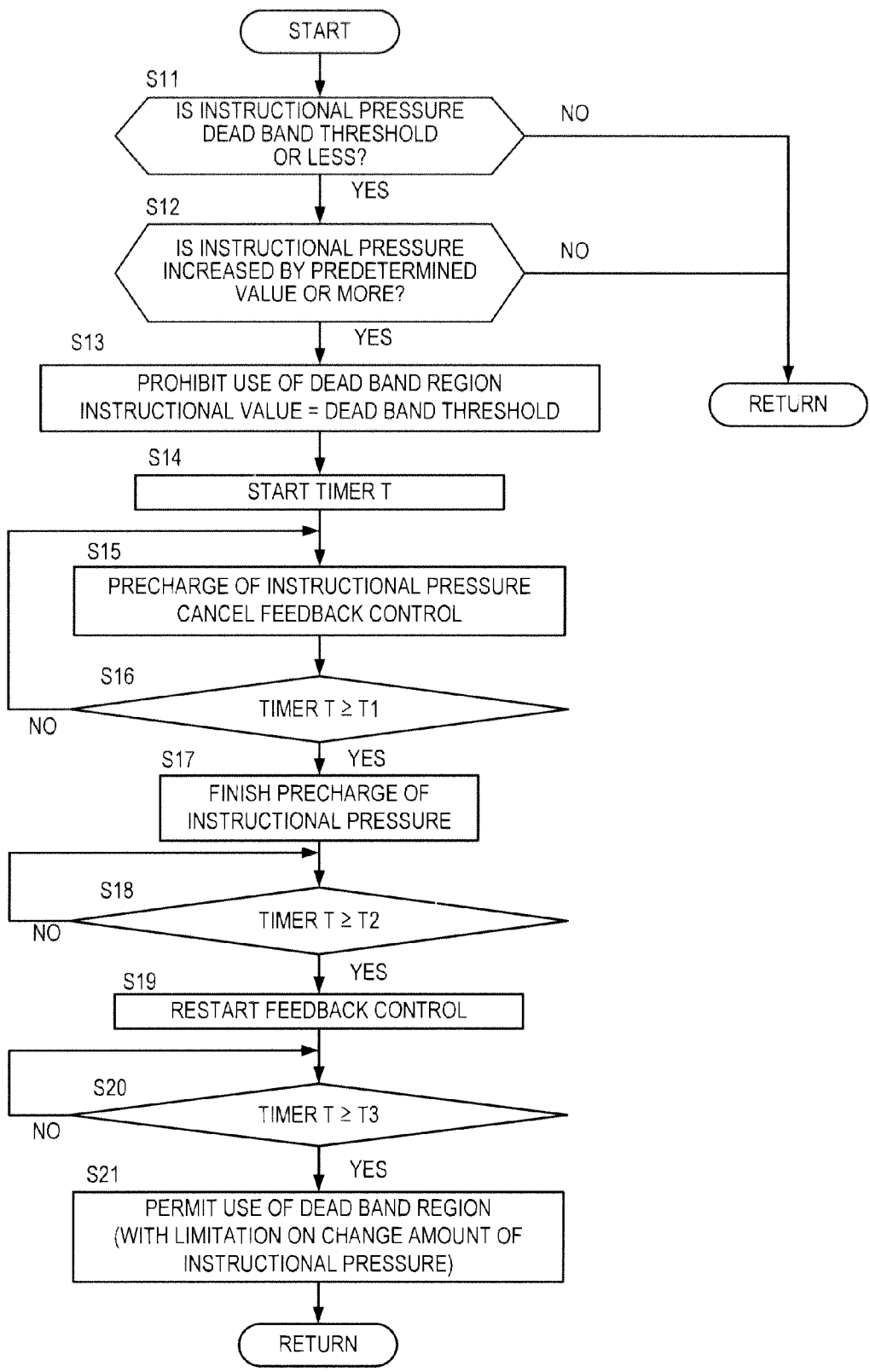
FIG. 4 is a flowchart for explaining control to exit from the dead band region performed by a CVT control unit.
Figure 5:
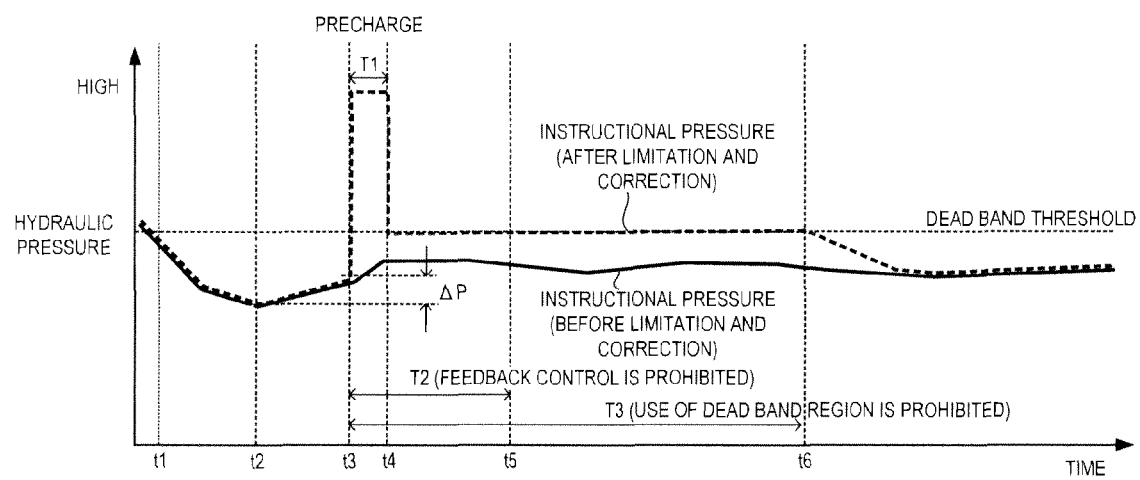
FIG. 5 is a time chart illustrating how the control to exit from the dead band region is performed.

FIG. 4 is a flowchart illustrating details of the control to exit from the dead band region performed by the CVT control unit 20. Moreover, FIG. 5 is a time chart illustrating how the control to exit from the dead band region is performed. Explanations on the control to exit from the dead band region will be made with reference to these drawings.

First, in S11, the CVT control unit 20 determines whether the instructional pressure of the solenoid valve 61 is the dead band threshold or less or not. When the determination is affirmative, the processing proceeds to S12, and when the determination is negative, the processing is ended. In FIG. 5, the affirmative determination is made at and after a time t1.

In S12, the CVT control unit 20 determines whether the instructional pressure of the solenoid valve 61 is increased from a previous value by a predetermined value or more within the dead band region or not (whether a change amount per unit time is the predetermined value or more or not), the predetermined value being a hydraulic pressure increase value that is not subjected to a downshift instruction, due to the operation state and torque fluctuation. When the determination is affirmative, the processing proceeds to S13, and when the determination is negative, the processing is ended. In FIG. 5, the change amount of the instructional pressure of the solenoid valve 61 is ΔP from a time t2 to a time t3, and it is determined at the time t3 that the change amount ΔP is the predetermined value or more.

In S13, occurrence of the down-shift is predicted from the increase in the hydraulic pressure in the dead band, and the CVT control unit 20 prohibits use of the dead band region and sets a lower limit of the instructional pressure as the dead band threshold, in order to allow the hydraulic pressure to quickly follow the down-shift that is caused in actuality. In FIG. 5, this corresponds to the time t3.

In S14, the CVT control unit 20 starts a timer T. The timer T is used for measuring a time and the like, during which the use of the dead band region is prohibited.

In S15, the feedback control of the solenoid valve 61 is cancelled. This is to prevent interference between the later-described precharge and the feedback control. In FIG. 5, the instructional pressure of the solenoid valve 61 is increased to a charge pressure and the feedback control of the instructional pressure is cancelled at the time t3.

Moreover, in S15, the CVT control unit 20 corrects the instructional pressure of the solenoid valve 61 after it is limited to the dead band threshold, and allows the instructional pressure of the solenoid valve 61 to increase stepwise to the charge pressure that is higher than the dead band threshold (precharge). This makes it possible to quickly increase the secondary pressure to the dead band threshold or more.

In S16, the CVT control unit 20 determines whether the timer T reaches T1 or not. When the timer T reaches the T1, the processing proceeds to S17 to end the precharge of the instructional pressure. When the timer T does not reach the T1, the processing returns to S15 to continue the precharge of the instructional pressure. The T1 is set so that the actual secondary pressure can be increased from the dead band to the dead band threshold without fail, and the T1 is set to have a larger value as a difference between the instructional pressure and the secondary pressure, immediately before the use of the dead band region is prohibited in S13, is greater. In FIG. 5, the precharge of the instructional pressure is performed until a time t4. When the precharge of the instructional pressure is continued for a predetermined period of time, it is possible to increase the actual secondary pressure to the dead band threshold or more without fail.

In the cases where the increase in the hydraulic pressure in the dead band region is detected, where the occurrence of the down-shift is predicted, and where the secondary pressure is kept at the dead band threshold or more, the secondary pressure can be increased immediately after the down-shift request, when the instructional pressure is limited to the dead band threshold or more, which makes it possible to respond to the shift request.

In S18, the CVT control unit 20 determines whether the timer T reaches T2 or not. When the timer T reaches the T2, the processing proceeds to S19 to restart the feedback control. When the timer T does not reach the T2, the processing waits at S18. In FIG. 5, the feedback control of the instructional pressure is cancelled until a time t5. The T2 is set as a time during which fluctuation of the actual secondary pressure is eliminated by the precharge immediately before that, and is set according to experimental results.

In S20, the CVT control unit 20 determines whether the timer T reaches T3 or not. When the timer T reaches the T3, the processing proceeds to S21 to permit the use of the dead band region. When the timer T does not reach the T3, the processing waits at S20. The T3 is a time that is set according to operation performance, and that is for suppressing control hunting that is caused when the use of the dead band region is prohibited and permitted repeatedly.

As the instructional pressure is limited to the dead band region or more and the secondary pressure is kept at the dead band threshold or more, until the use of the dead band region is permitted, the shift responsiveness at the time when the downshift request is made is secured. In FIG. 5, the instructional pressure is kept at the dead band threshold or more until a time t6, and thus the responsiveness when the downshift request is made is secured.

In S21, the CVT control unit 20 reduces the instructional pressure of the solenoid valve 61 to the dead band region again, on condition that the conditions for permitting the use of the dead band region are satisfied, such as the highest speed ratio of the continuously variable transmission 5.

A reduction speed of the instructional pressure has a limit, and the instructional pressure is reduced by using a predetermined ramp gradient. This is because, when the instructional pressure is reduced abruptly, there are possibilities that the secondary pressure is reduced too much due to undershoot, and that a belt slip is caused. In FIG. 5, this corresponds to a time t6 and thereafter.

Next, operation and effects that are obtained by performing the above-described control will be explained.

According to the above-described embodiment, the instructional pressure of the solenoid valve 61 is set at the dead band region and, when the instructional pressure of the solenoid valve 61 is increased within the dead band region, the instructional pressure is increased to the charge pressure in a stepwise manner. Thereafter, the lower limit of the instructional pressure is limited to the dead band threshold, and the use of the dead band region is prohibited for a predetermined period of time.

Thereby, as the occurrence of the down-shift is predicted during the use of the dead band region, and the secondary pressure is increased to the dead band threshold, it is possible to increase the secondary pressure quickly, and to secure the required shift responsiveness, even when it is necessary to increase the secondary pressure in response to the actual downshift request.

The use of the dead band region is prohibited only for a certain period of time and, when the downshift request is not made during the period of time, the instructional pressure of the solenoid valve 61 is reduced to the dead band region again. This makes it possible to satisfy both of the above-described requirements, that is, securing the responsiveness and improving the fuel efficiency.

Further, the use of the dead band region is permitted when the speed ratio of the continuously variable transmission 5 is the highest, the input rotation speed to the continuously variable transmission 5 is the predetermined low rotation speed or less, and the vehicle speed of the vehicle, on which the continuously variable transmission 5 is mounted, is the predetermined high vehicle speed or more.

Under the above-described circumstances, the required clamp force of the belt 12 is relatively small. Thus, the instructional pressure can be reduced to be lower than the dead band threshold without causing the belt 12 to slip. Further, the resulting deterioration in the responsiveness can be avoided by the above-described control to exit from the dead band region.

Furthermore, the charge time of the charge pressure is set to be longer as the difference between the instructional pressure and the dead band threshold, immediately before the instructional pressure increases, is greater. Thus-set charge pressure is able to cause the secondary pressure to be increased quickly to the dead band threshold or more with the minimum charge pressure, and to suppress the influence of the precharge on the fuel efficiency.

The embodiment of the present invention has been explained thus far, but the above-described embodiment is only one of the application examples of the present invention, and is not intended to limit the technical scope of the present invention to the concrete structure of the above-described embodiment.

For example, the case of applying the present invention to the solenoid valve 61 for adjusting the secondary pressure supplied to the secondary pulley 11 has been explained thus far. However, the present invention can be widely applied to the solenoid valves that adjust the hydraulic pressures, supplied to the hydraulic devices (hydraulic pistons, actuators, clutches, brakes, and the like) operated by the hydraulic pressures, based on the instructional pressures, and that use the dead band regions.

The present application claims priority to Japanese Patent Application No. 2012-74966 filed in the Japan Patent Office on Mar. 28, 2012. The contents of this application are incorporated herein by reference in their entirety.

The invention claimed is:

1. A hydraulic control circuit comprising:
   a solenoid valve, whose responsiveness of a change in an actual pressure with respect to a change in an instructional pressure deteriorates when the instructional pressure enters a dead band region that is on a lower pressure side than a dead band threshold, for adjusting a hydraulic pressure supplied to a hydraulic device operated by the hydraulic pressure based on the instructional pressure; and
   a controller configured to give an instruction of the instructional pressure to the solenoid valve,
   wherein, when the instructional pressure is set in the dead band region and the instructional pressure increases within the dead band region to such an extent that a speed ratio does not change, the controller increases the instructional pressure in a stepwise manner to a charge pressure that is higher than the dead band threshold, thereafter sets a lower limit of the instructional pressure to be the dead band threshold, and prohibits use of the dead band region for a certain period of time.

2. The hydraulic control circuit according to claim 1,
   wherein the solenoid valve is a solenoid valve that adjusts the hydraulic pressure supplied to a secondary pulley of a continuously variable transmission, and
   wherein the controller permits the use of the dead band region when the speed ratio of the continuously variable transmission is highest, an input rotation speed to the continuously variable transmission is a predetermined low rotation speed or less, and a vehicle speed of a vehicle on which the continuously variable transmission is mounted is a predetermined high vehicle speed or more.

3. The hydraulic control circuit according to claim 1,
   wherein the controller sets a charge time of the charge pressure to be longer as a difference between the instructional pressure and the dead band threshold, immediately before the instructional pressure increases, is greater.

4. A control method of a hydraulic control circuit including a solenoid valve, whose responsiveness of a change in an actual pressure with respect to a change in an instructional pressure deteriorates when the instructional pressure enters a dead band region that is on a lower pressure side than a dead hand threshold, for adjusting a hydraulic pressure supplied to a hydraulic device operated by the hydraulic pressure based on the instructional pressure, the control method comprising:
   increasing the instructional pressure in a stepwise manner to a charge pressure that is higher than the dead band threshold, when the instructional pressure is set in the dead band region and the instructional pressure increases within the dead hand region to such an extent that a speed ratio does not change; and
   thereafter setting a lower limit of the instructional pressure to be the dead band threshold, and prohibiting use of the dead hand region for a certain period of time.

5. The control method according to claim 4,
   wherein the solenoid valve is a solenoid valve that adjusts the hydraulic pressure supplied to a secondary pulley of a continuously variable transmission, and
   wherein the use of the dead band region is permitted when the speed ratio of the continuously variable transmission is highest, an input rotation speed to the continuously variable transmission is a predetermined low rotation speed or less, and a vehicle speed of a vehicle on which the continuously variable transmission is mounted is a predetermined high vehicle speed or more.

6. The control method according to claim 4,
wherein a charge time of the charge pressure is set to be longer as a difference between the instructional pressure and the dead band threshold, immediately before the instructional pressure increases, is greater.

* * * * *